(12) United States Patent
Kawada et al.

(10) Patent No.: US 11,063,254 B2
(45) Date of Patent: Jul. 13, 2021

(54) NEGATIVE ELECTRODE INCLUDING LITHIUM AND FLUORINE CONTAINING COATING FILM COVERING NEGATIVE ELECTRODE ACTIVE MATERIAL LAYER

(71) Applicant: Panasonic Intellectual Property Management Co., Ltd., Osaka (JP)

(72) Inventors: Hiroshi Kawada, Hyogo (JP); Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 83 days.

(21) Appl. No.: 16/448,562

(22) Filed: Jun. 21, 2019

(65) Prior Publication Data

US 2019/0312268 A1 Oct. 10, 2019

Related U.S. Application Data

(63) Continuation of application No. PCT/JP2017/038619, filed on Oct. 26, 2017.

(30) Foreign Application Priority Data

Dec. 26, 2016 (JP) .............................. JP2016-251557

(51) Int. Cl.
*H01M 4/36* (2006.01)
*H01M 4/133* (2010.01)
(Continued)

(52) U.S. Cl.
CPC ............ *H01M 4/366* (2013.01); *H01M 4/13* (2013.01); *H01M 4/133* (2013.01); *H01M 4/66* (2013.01);
(Continued)

(58) Field of Classification Search
CPC ........ H01M 4/366; H01M 4/13; H01M 4/133; H01M 4/66; H01M 10/052; H01M 10/0525; H01M 10/0568; H01M 10/0569
(Continued)

(56) References Cited

U.S. PATENT DOCUMENTS

2009/0111020 A1* 4/2009 Yamaguchi ....... H01M 10/0569
429/207
2010/0081062 A1 4/2010 Chiga et al.
(Continued)

FOREIGN PATENT DOCUMENTS

JP 10-116627 A 5/1998
JP 2006-100083 A 4/2006
(Continued)

OTHER PUBLICATIONS

International Search Report dated Dec. 5, 2017, issued in counterpart International Application No. PCT/JP2017/038619 (2 pages).

*Primary Examiner* — Sean P Cullen
(74) *Attorney, Agent, or Firm* — Westerman, Hattori, Daniels & Adrian, LLP

(57) ABSTRACT

A nonaqueous electrolyte secondary battery includes a positive electrode, a negative electrode, and a nonaqueous electrolyte having a lithium ion conductivity, and the negative electrode includes a negative electrode collector, a negative electrode active material layer provided on a surface of the negative electrode collector, and a coating film which at least partially covers a surface of the negative electrode active material layer and which has a lithium ion permeability. The coating film contains a lithium compound which contains an element M, an element A, an element F, and lithium; the element M is at least one selected from the group consisting of P, Si, B, V, Nb, W, Ti, Zr, Al, Ba, La, and
(Continued)

Ta; and the element A is at least one selected from the group consisting of S, O, N, and Br.

9 Claims, 2 Drawing Sheets

(51) Int. Cl.
*H01M 10/0525* (2010.01)
*H01M 10/0569* (2010.01)
*H01M 10/052* (2010.01)
*H01M 10/0568* (2010.01)
*H01M 4/66* (2006.01)
*H01M 4/13* (2010.01)
*H01M 4/02* (2006.01)

(52) U.S. Cl.
CPC ..... *H01M 10/052* (2013.01); *H01M 10/0525* (2013.01); *H01M 10/0568* (2013.01); *H01M 10/0569* (2013.01); *H01M 2004/021* (2013.01); *H01M 2004/027* (2013.01)

(58) Field of Classification Search
USPC ...................................... 429/231.8, 323, 324
See application file for complete search history.

(56) References Cited

U.S. PATENT DOCUMENTS

| | | | | |
|---|---|---|---|---|
| 2015/0243966 A1* | 8/2015 | Endo | ..................... | H01M 4/131 |
| | | | | 429/221 |
| 2016/0172682 A1* | 6/2016 | Martin | .................... | H01M 4/62 |
| | | | | 429/223 |
| 2020/0058932 A1* | 2/2020 | Maeda | ................. | H01M 4/133 |

FOREIGN PATENT DOCUMENTS

| | | | | |
|---|---|---|---|---|
| JP | 2008-135382 A | | 6/2008 | |
| JP | 2008-234988 A | | 10/2008 | |
| JP | 2009-252421 A | | 10/2009 | |
| JP | 2009-289414 A | | 12/2009 | |
| JP | 2010-27377 A | | 2/2010 | |
| JP | 2014232704 A | * | 12/2014 | |
| JP | 2015-109264 A | | 6/2015 | |
| WO | WO-2018083937 A1 | * | 5/2018 | ........ H01M 10/0568 |

* cited by examiner

NEGATIVE ELECTRODE INCLUDING LITHIUM AND FLUORINE CONTAINING COATING FILM COVERING NEGATIVE ELECTRODE ACTIVE MATERIAL LAYER

TECHNICAL FIELD

The present invention relates to improvement of a nonaqueous electrolyte secondary battery.

BACKGROUND ART

In a nonaqueous electrolyte secondary battery represented by a lithium ion secondary battery, in association with charge/discharge, a nonaqueous solvent and a lithium salt, each of which forms a nonaqueous electrolyte, partially irreversibly react with each other. As measures for this, in order to suppress oxidative decomposition of the nonaqueous solvent on a positive electrode, introduction of fluorine in a molecular structure of the nonaqueous solvent has been proposed (Patent Documents 1 and 2).

CITATION LIST

Patent Document
PTD 1: Japanese Published Unexamined Patent Application No. 2009-289414
PTD 2: Japanese Published Unexamined Patent Application No. 10-116627

SUMMARY OF INVENTION

Technical Problem

On the other hand, on a negative electrode, the nonaqueous solvent and the lithium salt partially irreversibly react with each other by reductive decomposition, and a solid electrolyte interface (SEI) is generated so as to cover the surface of a negative electrode active material. SEI performs an important role to smoothly advance a reaction between the negative electrode active material and lithium ions. However, because of a nonaqueous solvent in which fluorine is introduced, when fluorine is introduced also in SEI, a negative electrode resistance is increased, and the internal resistance of the battery tends to be increased.

In consideration of the situation described above, a nonaqueous electrolyte secondary battery according to the present disclosure comprises: a positive electrode; a negative electrode, and a nonaqueous electrolyte having a lithium ion conductivity, and at least a part of a surface of the negative electrode is provided with a coating film having a lithium ion permeability. The coating film described above contains a lithium compound containing an element M, an element A, an element F, and lithium; the element M is at least one selected from the group consisting of P, Si, B, V, Nb, W, Ti, Zr, Al, Ba, La, and Ta; and the element A is at least one selected from the group consisting of S, O, N, and Br. The nonaqueous electrolyte contains a lithium salt and a nonaqueous solvent dissolving the lithium salt, and the nonaqueous solvent contains a compound having a fluoro group.

According to the nonaqueous electrolyte secondary battery of the present disclosure, even when the nonaqueous solvent contains a compound having a fluoro group, a nonaqueous electrolyte secondary battery in which the internal resistance is reduced can be obtained.

DESCRIPTION OF EMBODIMENTS

Figure 1:
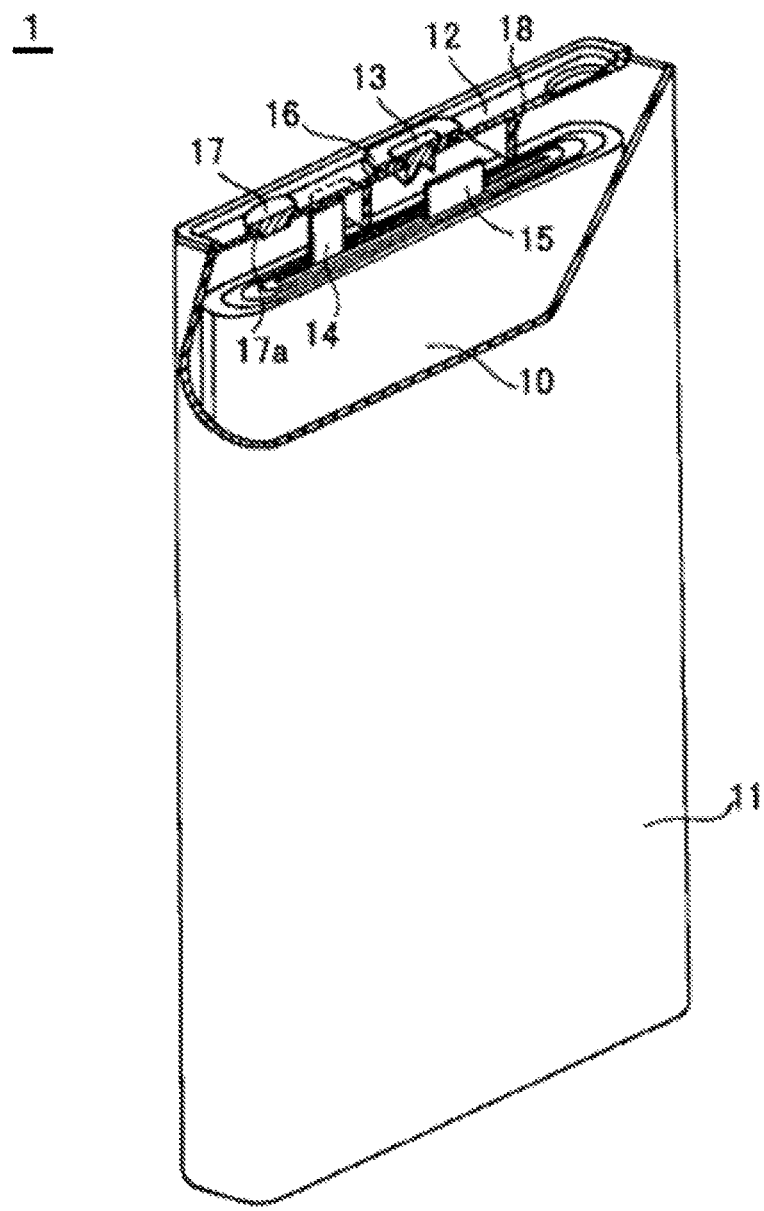
FIG. 1 is a partially cut-away perspective view of a nonaqueous electrolyte secondary battery according to one embodiment of the present invention.

A nonaqueous electrolyte secondary battery according to an embodiment of the present invention comprises: a positive electrode, a negative electrode, and a nonaqueous electrolyte having a lithium ion conductivity. At least a part of a surface of the negative electrode is provided with a coating film having a lithium ion permeability. The negative electrode includes, for example, a negative electrode collector, a negative electrode active material layer provided on a surface of the negative electrode collector, and a coating film covering at least a part of a surface of the negative electrode active material layer.

The surface of the negative electrode active material layer is not limited to a surface of the negative electrode active material layer facing the positive electrode with a separator interposed therebetween and includes inner walls of voids in a porous negative electrode active material layer. The coating film covering the surface of the negative electrode active material layer preferably intrudes in the voids formed in the negative electrode active material layer so as to cover the inner walls.

The coating film having a lithium ion permeability preferably selectively covers a portion of the negative electrode active material layer which functions as an origin of decomposition of the nonaqueous electrolyte. Accordingly, an excessive generation of SEI and/or an increase in irreversible capacity can be effectively suppressed. Hence, a coating film having an appropriate thickness can be formed, and the increase in internal resistance is likely to be suppressed.

The coating film having a lithium ion permeability contains a lithium compound containing an element M, an element A, an element F, and lithium. The element M is at least one selected from the group consisting of P, Si, B, V, Nb, W, Ti, Zr, Al, Ba, La, and Ta. The element A is at least one selected from the group consisting of S, O, N, and Br.

A coating film formed from a lithium compound containing an F element has a high strength and an excellent oxidation resistance. Hence, a nonaqueous electrolyte secondary battery having a high durability can be obtained. In general, when fluorine is introduced in SEI, the negative electrode resistance is increased, and the internal resistance of the battery tends to be increased. On the other hand, in the case of a coating film having the composition described above, when fluorine is introduced, the increase in negative electrode resistance can be suppressed. Compared to a coating film in which no fluorine is introduced, when a coating film in which fluorine is introduced is provided, actually, the negative electrode resistance tends to be reduced.

The nonaqueous electrolyte contains a lithium salt and a nonaqueous solvent dissolving the lithium salt. The nonaqueous solvent contains a compound having a fluoro group.

The compound having a fluoro group is a generic name of a solvent component having a C—F bond. Since the compound having a fluoro group is contained in the nonaqueous solvent, fluorine can be easily introduced in the lithium compound which forms a coating film. The amount of the compound having a fluoro group in the nonaqueous solvent is preferably 5 to 100 percent by mass.

As the compound having a fluoro group, for example, a carbonate ester (hereinafter, referred to as "fluorinated carbonate ester) in which a fluorine atom is introduced or a carboxylic acid alkyl ester (hereinafter, referred to as "fluorinated carboxylic acid ester) in which a fluorine atom is introduced is preferable. In a compound in which a fluorine atom having a strong electron-withdrawing property is introduced as a substituent, since the electron density is decreased, electrons are not likely to be collected (oxidized) by the positive electrode.

As the fluorinated carbonate ester, for example, there may be mentioned a fluorinated cyclic carbonate, such as fluoroethylene carbonate (FEC), 4,5-difluoro-1,3-dioxolane-2-one, 4,4-difluoro-1,3-dioxolane-2-one, 4-fluoro-5-methyl-1,3-dioxolane-2-one, 4-fluoro-4-methyl-1,3-dioxolane-2-one, 4-trifluoromethyl-1,3-dioxolane-2-one, or 4,5-difluoro-4,5-dimethyl-1,3-dioxolane-2-one; or a fluorinated chain carbonate, such as a compound in which at least one hydrogen atom of dimethyl carbonate, ethyl methyl carbonate, diethyl carbonate, or the like is substituted by fluorine.

The amount of the fluorinated carbonate ester in the nonaqueous electrolyte is, for example, 0 to 30 percent by mass, preferably 1 to 25 percent by mass, and further preferably 2 to 20 percent by mass. In general, when the nonaqueous electrolyte contains a compound having a fluoro group, the viscosity is liable to be increased, and the ion conductivity is liable to be decreased. On the other hand, when a fluorinated carbonate ester (in particular, a fluorinated cyclic carbonate) having a high dielectric constant is used, dissociation of carrier ions is promoted, and the ion conductivity of the nonaqueous electrolyte can be increased. In particular, by reductive decomposition, since FEC forms a preferable coating film on the surface of the negative electrode active material layer, the increase in internal resistance is likely to be suppressed.

As the fluorinated carboxylic acid ester, for example, there may be mentioned an alkyl ester of a carboxylic acid in which a fluorine atom is introduced, a fluorinated alkyl ester of a carboxylic acid in which no fluorine atom is introduced, or a fluorinated alkyl ester of a carboxylic acid in which a fluorine atom is introduced. As concrete examples of those esters, for example, the following may be mentioned.

Formula (1):

[Chem. 1]

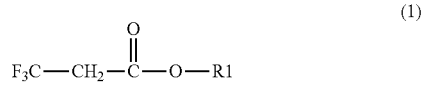
(1)

A trifluoropropionate ester (hereinafter, also referred to as "trifluoropropionate ester (1)" in some cases) represented by the above formula (1) (in the formula, R1 represents a $C_{1-3}$ alkyl group).

Formula (2):

[Chem. 2]

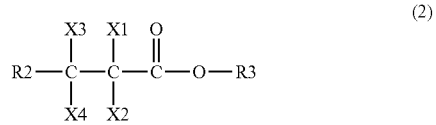
(2)

A fluorinated carboxylic acid ester (hereinafter, also referred to as "fluorinated carboxylic acid ester (2)" in some cases) represented by the above formula (2) (in the formula, X1, X2, X3, and X4 each represent a hydrogen atom or a fluorine atom; one or two of X1, X2, X3, and X4 each represent a fluorine atom; R2 represents a hydrogen atom, a $C_{1-3}$ alkyl group, or a fluorinated $C_{1-3}$ alkyl group; and R3 represents a $C_{1-3}$ alkyl group or a fluorinated $C_{1-3}$ alkyl group).

Formula (3):

[Chem. 3]

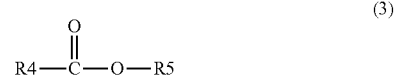
(3)

A carboxylic acid fluoroalkyl ester (hereinafter, also referred to as "carboxylic acid fluoroalkyl ester (3)" in some cases) represented by the above formula (3) (in the formula, R4 represents a $C_{1-3}$ alkyl group, and R5 represents a fluorinated $C_{1-3}$ alkyl group).

In the formula (1), as the $C_{1-3}$ alkyl group represented by R1, for example, there may be mentioned a methyl group, an ethyl group, an n-propyl group, or an i-propyl group. Among those groups mentioned above, a methyl group or an ethyl group is preferable. The nonaqueous electrolyte may contain one type of trifluoropropionate ester (1) or at least two types of trifluoropropionate esters (1). In particular, when methyl 3,3,3-trifluoropropionate (FMP) which contains a methyl group as R1 is used, a high oxidation resistance can be obtained at a low viscosity. Hence, a trifluoropropionate ester (1) containing at least FMP is preferably used. The rate of FMP in the trifluoropropionate ester (1) is, for example, 50 percent by mass or more and preferably 80 percent by mass or more, and in addition, FMP may only be used.

The amount of the trifluoropropionate ester (1) in the nonaqueous electrolyte is preferably 10 percent by mass or more and more preferably 20 percent by mass or more and may be 30 percent by mass or more. When the amount of the trifluoropropionate ester (1) is in the range as described above, a high oxidation resistance of the nonaqueous electrolyte can be secured.

When the amount of the trifluoropropionate ester (1) in the nonaqueous electrolyte is 10 percent by mass or more, the trifluoropropionate ester (1) is liable to be decomposed by a function of an alkali component remaining in positive electrode active material particles. Hence, the trifluoropropionate ester (1) and the fluorinated carboxylic acid ester (2) are preferably used in combination. Accordingly, since the decomposition of the trifluoropropionate ester (1) is suppressed, the initial efficiency is not only improved, but the reaction resistance is also not likely to be increased.

Next, in the formula (2), as the $C_{1-3}$ alkyl group represented by each of R2 and R3 and a $C_{1-3}$ alkyl group portion of the fluorinated $C_{1-3}$ alkyl group, the groups described by way of example as R1 each may be mentioned. In the fluorinated $C_{1-3}$ alkyl group, the number of fluorine atoms is appropriately determined in accordance with the number of carbon atoms of the alkyl group and is preferably 1 to 5 and may be 1 to 3. As the fluorinated $C_{1-3}$ alkyl group, for example, there may be mentioned a fluoromethyl group, a fluoroethyl group, a difluoromethyl group, a trifluoromethyl group, or 2,2,2-trifluoroethyl group. Among those groups mentioned above, as R2, a hydrogen atom or the $C_{1-3}$ alkyl group is preferable, and a hydrogen atom is particularly preferable. As R3, the $C_{1-3}$ alkyl group is preferable.

In the formula (2), one or two of X1 to X4 each may be a fluorine atom. When one of X1 to X4 is a fluorine atom, the position of the fluorine atom may be either the α position (such as X1) or the β position (such as X3) of the carbonyl group of the formula (2). When two of X1 to X4 are fluorine atoms, the positions of the fluorine atoms may be only the α position (X1 and X2), only the β position (X3 and X4), or the α position and the β position (such as X1 and X3). In particular, at least one of X1 and X2 is preferably a fluorine atom (that is, a fluorine atom is located at the α position of the carbonyl group).

As the fluorinated carboxylic acid ester (2), for example, there may be mentioned ethyl 2-fluoropropionate (αF-EP), ethyl 3-fluoropropionate, ethyl 2,2-difluoropropionate, ethyl 2,3-difluoropropionate, or ethyl 3,3-difluoropropionate. Among those esters mentioned above, a fluorinated carboxylic acid ester having a fluorine atom at the α position is preferable, and the fluorinated carboxylic acid ester (2) preferably contains at least αF-EP. Compared to an ester in which a fluorine atom is located at the β position, by an ester in which a fluorine atom is located at the α position, fluorination can be easily performed in synthesis, and the cost can be reduced.

The amount of the fluorinated carboxylic acid ester (2) in the nonaqueous electrolyte is, for example, 0 to 10 percent by mass, preferably 0.1 to 10 percent by mass, more preferably 0.5 to 7 percent by mass, and further preferably 1 to 6 percent by mass. Accordingly, while a high oxidation resistance of the nonaqueous electrolyte is secured, the decomposition of the trifluoropropionate ester (1) is likely to be suppressed.

Next, in the formula (3), as the $C_{1-3}$ alkyl group represented by R4 and a $C_{1-3}$ alkyl group portion of the fluorinated $C_{1-3}$ alkyl group represented by R5, the groups described by way of example as R1 may be mentioned. The number of fluorine atoms of R5 can be selected in accordance with the number of carbon atoms of the $C_{1-3}$ alkyl group and is preferably 1 to 5 and more preferably 1 to 3. As R4, a methyl group or an ethyl group is preferable, and in order to decrease the viscosity, a methyl group is preferable. As R5, for example, a trifluoromethyl group or a 2,2,2-trifluoroethyl group is preferable, and in particular, since being derived from easily available 2,2,2-trifluoroethanol, a 2,2,2-trifluoroethyl group is preferable.

Among the carboxylic acid fluoroalkyl esters (3), 2,2,2-trifluoroehtyl acetate (FEA) is preferable. Hence a carboxylic acid fluoroalkyl ester (3) containing at least FEA is preferably used.

The amount of the carboxylic acid fluoroalkyl ester (3) in the nonaqueous electrolyte is, for example, 0 to 60 percent by mass, preferably 1 to 50 percent by mass, and further preferably 10 to 45 percent by mass. When the carboxylic acid fluoroalkyl ester (3) is used, the viscosity of the nonaqueous electrolyte is likely to be decreased.

The carboxylic acid fluoroalkyl ester (3) has an effect of improving a coating film forming ability of the fluorinated carboxylic acid ester (2) and can further suppress the decomposition of the trifluoro-carboxylic acid ester (1). Since the carboxylic acid fluoroalkyl ester (3) contains no fluorine in R4, and no HF dissociation caused by an alkali occurs, the durability of a coating film to be generated is believed to be high. Accordingly, while the initial efficiency and the reaction resistance are improved, a high durability of the trifluoro-carboxylic acid ester (1) can be obtained.

As the coating film having a lithium ion permeability and covering at least a part of the surface of the negative electrode, a uniform layer covering the surface of the negative electrode active material layer is preferably formed using a necessary and sufficient amount. Hence, the thickness of the coating film (average value Tav which will be described later) is preferably smaller than the average particle diameter of the particles of the negative electrode active material and is, for example, preferably 0.2 μm (200 nm) or less, more preferably 0.1 μm (100 nm) or less, and further preferably 0.085 μm (85 nm) or less. However, when the thickness of the coating film is excessively decreased, for example, electron transfer by the tunnel effect may occur, and the reductive decomposition of the nonaqueous electrolyte may be advanced in some cases. In order to suppress the electron transfer and, in addition, to smoothly transfer lithium ions, the thickness of the coating film is preferably 0.5 nm or more and more preferably 5 nm or more. When the thickness of the coating film is controlled in the range described above, it is believed that the amount of the coating film becomes appropriate, and the negative electrode active material layer is likely to be covered with a uniform coating film. In this case, even when the coating film contains fluorine, the increase in negative electrode resistance is likely to be suppressed, and the negative electrode resistance is likely to be reduced as compared to that obtained when the coating film contains no fluorine.

The thickness of the coating film can be measured by an XPS. In particular, the negative electrode recovered from the battery is washed with ethyl methyl carbonate (EMC) and then dried. Subsequently, along the thickness direction (that is, direction from the surface of the coating film to the inside of the negative electrode) of the coating film, the composition of the coating film is analyzed. When 70 percent by mass or more of the negative electrode active material is carbon material particles, by the analysis of the coating film using an XPS, a peak belonging to the element C derived from the carbon material particles is observed. The peak belonging to the element C is gradually increased and is saturated toward the maximum value.

Based on experienced knowledge, the thickness of the coating film can be assumed to be two times a depth at which the concentration of the element C reaches 45 percent by atom. In this case, the "concentration of element C (45 percent by atom)" indicates the rate of the element C with respect to the total of the element M, the element A, the element F, lithium, and the element C contained in the coating film. The concentration of the element C can be measured by an XPS. In particular, from the analytical result obtained at a predetermined depth of the coating film, the peaks belonging to the elements M, A, F, Li, and C are identified, and the peak areas thereof are measured. From the peak areas thus obtained, by using accessory computing software of XPS, the molar ratio of each element can be calculated.

As is the case described above, when the negative electrode active material is formed of 70 percent by mass or more of a material other than the carbon material particles, the thickness of the coating film can be assumed to be two times a depth at which the concentration of an element derived from the above material reaches 45 percent by atom.

When a uniform coating film effective to reduce the negative electrode resistance is formed, at a plurality of points on the negative electrode (negative electrode active material layer), the thickness of the coating film is preferably measured by an XPS. In particular, in the case in which the thickness of the coating film is measured at 10 points, when an average value obtained from two values at the largest side is represented by Tmax-av, an average value obtained from two values at the smallest side is represented by Tmin-av, and an average value of 10 points is represented by Tav, the differences ΔT (Tmax-av-Tav and Tav-Tmin-av) from the average value Tav of 10 points are each preferably 50% or less of the average value Tav of 10 points and more preferably 35% or less thereof.

The concentration of F contained in the lithium compound is preferably high at a surface side of the coating film and low at a negative electrode active material side of the coating film. In this case, the surface of the coating film is not at an interface side between the coating film and the surface of the negative electrode or the negative electrode active material but indicates a surface at an interface side between the coating film and the nonaqueous electrolyte. When a larger amount of fluorine is distributed at the surface side of the coating film, while the strength of the coating film is secured, the F concentration contained in the whole coating film can be decreased. In addition, when the F concentration at the surface side of the coating film is set to be high at the initial charge/discharge, excessive decomposition of the nonaqueous solvent or the compound having a fluoro group performed thereafter can be suppressed. Hence, when charge/discharge cycles are repeatedly performed, the increase in negative electrode resistance is likely to be suppressed.

In the vicinity of the surface of the coating film, the lithium compound preferably satisfies $0.3 \leq (F/A)_1 \leq 6$, the $(F/A)_1$ indicating the molar ratio of F with respect to the element A contained in the lithium compound, and more preferably satisfies $0.5 \leq (F/A)_1 \leq 6$. In this case, since a sufficient amount of fluorine is distributed in the vicinity of the surface of the coating film, a sufficient effect of suppressing the increase in negative electrode resistance can be obtained. In addition, the vicinity of the surface indicates any region from the surface of the coating film at a measurement point to a depth of 5% to 20% of the thickness of the coating film.

The molar ratios each can be measured by an XPS. In particular, from the analytical results at a predetermined depth of the coating film, peaks belonging to the elements A and F are each identified, and the peak areas thereof are measured. From the ratio between the peaks areas thus obtained, by using accessory computing software of XPS, the molar ratio of F with respect to the element A can be calculated.

When a larger amount of fluorine is distributed at the surface side of the coating film, from the surface of the coating film to the negative electrode surface (or the surface of the negative electrode active material), the peak belonging to the element A is gradually increased to the maximum value and is then gradually decreased. On the hand, the peak belonging to the element F shows the maximum value at a more surface side of the coating film. That is, the molar ratio: $(F/A)_2$ of F with respect to the element A contained in the lithium compound in the vicinity of the interface between the coating film and the negative electrode surface shows a smaller value than $(F/A)_1$. At both the interface sides of the coating film with the nonaqueous electrolyte and the negative electrode surface, when the coating film is more uniformly formed, the ratio represented by $(F/A)_1/(F/A)_2$ tends to be increased. For example, $1.2 \leq (F/A)_1/(F/A)_2 \leq 10$ is preferably satisfied, and $1.3 \leq (F/A)_1/(F/A)_2 \leq 10$ is more preferably satisfied. In this case, in the vicinity of the interface between the coating film and the negative electrode surface, a portion at which the element F is not substantially contained may be present so as to satisfy $(F/A)_2 \leq 0.01$. In addition, the vicinity of the interface between the coating film and the negative electrode surface indicates any region from the surface of the coating film at a measurement point to a depth of 80% to 95% of the thickness of the coating film.

In order to form the coating film having the distribution of the F concentration as described above on the surface of the negative electrode or the negative electrode active material layer, after a nonaqueous electrolyte secondary battery which includes: a negative electrode having a coating film formed by a lithium compound (hereinafter, also referred to as "first compound" in some cases) containing the element M, the element A, and lithium; and a nonaqueous electrolyte in which a nonaqueous solvent contains a compound having a fluoro group is assembled, charge/discharge may be performed. By the charge/discharge, at least a part of the compound having a fluoro group is decomposed and is deposited as a part of the coating film at the surface side thereof. Accordingly, a coating film having a high F concentration region at the surface side is formed. In this case, by the coating film having an inner layer and an outer layer, the surface of the negative electrode is covered.

In general, the compositions of constituent elements of the inner layer and the outer layer are different from each other, and in one of the inner layer and the outer layer, at least one element not contained in the other one of the inner layer and the outer layer is contained. The inner layer mainly contains the first compound provided in advance on the surface of the negative electrode. The outer layer mainly contains an element derived from the component contained in the nonaqueous electrolyte. That is, the outer layer contains at least a lithium compound (hereinafter, also referred to as "second compound" in some cases) containing fluorine.

In the case in which the coating film includes the inner layer and the outer layer, when the analysis of the structure of the coating film is performed in the thickness direction of the coating film, a concentration C1 of the first compound (or at least one selected from the element M, the element A, and lithium, each of which is the constituent element of the first compound) is low at the surface side of the coating film and is high at the interface side between the coating film and the surface of the negative electrode. At the boundary in the vicinity of the interface between the coating film and the surface of the negative electrode, the concentration C1 is decreased toward the inside of the negative electrode. That is, in the direction from the surface side of the coating film to the inside of the negative electrode, the concentration C1 has the maximum value. On the other hand, a concentration C2 of the second compound (or fluorine) is high at the surface side of the coating film and is low at the interface side between the coating film and the surface of the negative electrode. The maximum value of the concentration C2 is confirmed at a more surface side of the coating film than the maximum value of the concentration C1. In addition, the analysis described above can be performed by an XPS, an EPMA, and the like as described above.

As the first compound and the second compound, a lithium salt of a polyanion is preferable. As the polyanion, for example, a molecular ion species represented by a composition formula of $[MX_y]^{x-}$ may be mentioned. However, the number of the central atom M is not limited to one, and the central atom M is not limited to one type. The element X is an anion of the element A and/or F. A lithium salt of a polyanion containing the element M and the element X, which is represented by a composition formula of $Li_xMX_y$, has an A-Li bond (such as an O—Li bond) having an ion bonding property and shows a lithium ion conductivity when lithium ions hop between the A sites. In particular, since being a polyoxometalate compound, the first compound is preferable in view of the stability. In addition, the range of X is, for example, $0.5 \leq x \leq 4$ and is preferably $1 \leq y \leq 6$.

As concrete examples of the polyoxometalate compound to be used as the first compound, for example, $Li_3PO_4$, $Li_4SiO_4$, $Li_2Si_2O_5$, $Li_2SiO_3$, $Li_3BO_3$, $Li_3VO_4$, $Li_3NbO_4$, $LiZr_2(PO_4)$, $LiTaO_3$, $Li_4Ti_5O_{12}$, $Li_7La_3Zr_2O_{12}$, $Li_5La_3Ta_2O_{12}$, $Li_{0.35}La_{0.55}TiO_3$, $Li_9SiAlO_8$, and $Li_{1.3}Al_{0.3}Ti_{1.7}(PO_4)_3$ may be used alone, or at least two thereof may be used in combination. Among those compounds mentioned above, at least one selected from the group consisting of $Li_3PO_4$, $Li_4SiO_4$, $Li_2Si_2O_5$, $Li_2SiO_3$, $Li_3BO_3$, $Li_3VO_4$, and $Li_3NbO_4$ is preferably used since being excellent in lithium ion permeability.

Among those compounds mentioned above, a lithium silicate, such as $Li_4SiO_4$, $Li_2Si_2O_5$, or $Li_2SiO_3$, has an excellent compatibility with an alloy-based negative electrode active material containing silicon (such as a silicon oxide or a silicon alloy). In particular, since being not likely to cause a side reaction involving gas generation and being relatively inexpensive, $Li_4SiO_4$ is preferable. It is believed that $Li_4SiO_4$ having a large amount of lithium is not likely to cause a side reaction incorporating lithium ions. The polyoxometalate compound preferably contains at least $Li_4SiO_4$.

As concrete examples of the polyoxometalate compound to be used as the second compound, a compound in which at least one of the oxygen atom-containing groups (such as O—Li groups of $Li_3PO_4$) in each of the above compounds is substituted by fluorine is preferable.

When the negative electrode active material layer is a mixture (mixture agent) containing a negative electrode active material, a binder, and the like, after negative electrode active material particles and the binder are mixed together, and the negative electrode active material layer is formed, the coating film covering the surface of the negative electrode active material layer is preferably formed on the surface thereof. In this case, unlike the case in which, before the negative electrode active material layer is formed, the coating film is formed in advance on the negative electrode active material particles, the coating film is formed after electron conduction paths are formed in the negative electrode active material layer. In addition, at adhesion interfaces between the binder and the negative electrode active material particles, since no coating film is provided between the binder and the negative electrode active material particles, the distance between the negative electrode active material particles is decreased. Hence, the negative electrode resistance is likely to be reduced.

When viewed in microscopic manner, the surface of the negative electrode collector is not fully covered with the negative electrode active material and the binder but has minute exposed surfaces. In addition, the negative electrode collector may have an exposed cut-off end surface and/or an exposed lead fitting portion in some cases. After the negative electrode active material layer is formed, when the coating film is formed on the surface thereof, the coating film is able to cover the exposed surfaces of the negative electrode collector as described above. Since the surface of the negative electrode collector is partially covered with the coating film, the decomposition of the nonaqueous electrolyte starting from the surface of the negative electrode collector which functions as the origin can be suppressed.

As described above, when the coating film is formed after the negative electrode active material layer is formed, the surface of the binder can be partially covered with the coating film. In addition, when the negative electrode active material layer contains an electrically conductive agent, the coating film can partially cover the surface of the electrically conductive agent. Accordingly, the decomposition of the nonaqueous electrolyte starting from the binder and/or the electrically conductive agent, each of which functions as the origin, can also be suppressed.

When the negative electrode active material layer contains carbon material particles as the negative electrode active material, the coating film at least partially covers the surfaces of the carbon material particles. In this case, at interfaces between the carbon material particles and the lithium compound, a compound having an M-C bond (bond between the element M and a carbon element C) is preferably formed. Accordingly, the bond between the coating film and the carbon material particles is strengthened, and hence, the coating film is suppressed from being peeled away. Accordingly, the origin of the decomposition of the nonaqueous electrolyte is suppressed from being newly generated.

In order to cover the surface of the binder with the coating film, the coating film is necessarily formed at a temperature lower than the heat resistant temperature of the binder. Although the heat resistant temperature of the binder is changed depending on the type of binder, as a target temperature at which the coating film is formed, the temperature is preferably 200° C. or less and more preferably 120° C. or less.

In addition, after the coating film is formed in advance on the surfaces of the negative electrode active material particles, the negative electrode active material layer may be formed using the negative electrode active material particles provided with the coating film so as to obtain the negative electrode. In this case, the surfaces of the negative electrode active material particles disposed on the negative electrode surface are provided with the coating film in advance, and hence, excessive generation of SEI can be effectively suppressed.

Hereinafter, one example of a sheet-shaped negative electrode forming a winding type electrode group or a laminate type electrode group will be further described.

(Negative Electrode)

The sheet-shaped negative electrode includes a sheet-shaped negative electrode collector, a negative electrode active material layer formed on a surface of the negative electrode collector, and a coating film on a surface of the negative electrode active material layer. The negative electrode active material layer may be formed either on one surface of the negative electrode collector or on two surfaces thereof.

(Negative Electrode Collector)

As the negative electrode collector, for example, there may be mentioned metal foil, a metal sheet, a mesh body, a punched sheet, or an expanded metal. As a material of the negative electrode collector, for example, stainless steel, nickel, copper, or a copper alloy may be used. The thickness of the negative electrode collector may be selected, for example, from a range of 3 to 50 µm.

(Negative Electrode Active Material Layer)

The case in which the negative electrode active material layer is a mixture (mixture agent) containing negative electrode active material particles will be described. The negative electrode active material layer contains as an essential component, a negative electrode active material and a binder, and as an arbitrary component, may also contain an electrically conductive agent. The amount of the binder contained in the negative electrode active material layer is, with respect to 100 parts by mass of the negative electrode active material, preferably 0.1 to 20 percent by mass and more preferably 1 to 5 percent by mass. The thickness of the negative electrode active material layer is, for example, 10 to 100 µm.

The negative electrode active material may be a non-carbon material, a carbon material, or a combination therebetween. In general, the carbon material occludes or releases lithium ions at a potential of 1 V or less with reference to metal lithium. In this potential range, the reductive decomposition of the constituent element of the nonaqueous electrolyte is likely to proceed on the surface of the carbon material, and SEI is liable to be generated. When the surface of the negative electrode active material layer is covered with a coating film having a lithium ion permeability, since the contact between the carbon material and the nonaqueous electrolyte is suppressed, excessive generation of SEI is also suppressed.

Although the carbon material used as the negative electrode active material is not particularly limited, for example, at least one selected from the group consisting of graphite and hard carbon is preferable. In particular, since having a high capacity and a small irreversible capacity, graphite is promising. In addition, since graphite has a high activity to the reductive decomposition of the nonaqueous electrolyte, an effect of covering the surface of the negative electrode active material layer with the coating film is also significant.

Graphite is a generic name of carbon materials having a graphite structure and includes natural graphite, artificial graphite, expanded graphite, graphitized mesophase carbon particles, and the like. As the natural graphite, for example, flaky graphite or earthy graphite may be mentioned. In general, carbon materials in each of which the plane distance $d_{002}$ of the plane 002 of a graphite structure calculated from an X-ray diffraction spectrum is 3.35 to 3.44 Å are each classified in graphite. On the other hand, hard carbon is a carbon material in which fine graphite crystals are arranged in random directions and further graphitization is not substantially advanced, and the plane distance $d_{002}$ of the plane 002 is larger than 3.44 Å.

As the non-carbon material used as the negative electrode active material, an alloy-based material is preferable. The alloy-based material preferably contains silicon and/or tin, and in particular, a single silicon element or a silicon compound is preferable. The silicon compound includes a silicon oxide and a silicon alloy.

In order to increase the filling property of the negative electrode active material to the negative electrode active material layer, the average particle diameter (D50) of the negative electrode active material particles is preferably sufficiently small with respect to the thickness of the negative electrode active material layer. The average particle diameter (D50) of the negative electrode active material particles is, for example, preferably 5 to 30 µm and more preferably 10 to 25 µm. In addition, the average particle diameter (D50) indicates the median diameter at which the cumulative volume in a volume-basis particle size distribution is 50%. The average particle diameter can be measured, for example, using a laser diffraction/scattering particle size distribution meter.

As the binder, for example, there may be mentioned a fluorine resin, such as a poly(vinylidene fluoride) (PVdF), a polytetrafluoroethylene (PTFE), or a tetrafluoroethylene-hexafluoropropylene copolymer (HFP); an acrylic resin, such as a poly(methyl acrylate) or an ethylene-methyl methacrylate copolymer; a rubber material, such as a styrene-butadiene rubber (SBR) or an acrylic rubber; or a water-soluble polymer, such as a carboxymethyl cellulose (CMC) or a poly(vinyl pyrrolidone).

As the electrically conductive agent, for example, carbon black, such as acetylene black or KETJENBLACK® (a commercially available electrically conductive carbon black), is preferable.

The negative electrode active material layer may be formed in such a way that after the negative electrode active material particles, the binder, and the like are mixed together with a dispersant to prepare a negative electrode slurry, this negative electrode slurry is applied to a surface of the negative electrode collector, followed by drying and rolling. As the dispersant, for example, water, an alcohol such as ethanol, an ether such as tetrahydrofuran, or N-methyl-2-pyrrolidone (NMP) may be used. When water is used as the dispersant, as the binder, a rubber material and a water-soluble polymer are preferably used in combination.

(Coating Film Having Lithium Ion Permeability)

The coating film having a lithium ion permeability which covers the surface of the negative electrode active material layer is formed, for example, in such a way that a negative electrode precursor including a negative electrode collector and a negative electrode active material layer provided on a surface thereof is exposed to an atmosphere at 200° C. or less containing a raw material of the coating film.

Since being formed after the negative electrode active material layer is formed, the coating film is not formed at contact interfaces between the negative electrode active material particles, the adhesion interfaces between the binder and the negative electrode active material particles, and the like.

The lithium ion permeability of the coating film may be set so as to enable lithium ions present in the vicinity of the particles of the negative electrode active material to come in and go out between the particles of the negative electrode active material and is not required to be a high lithium ion conductive property. Although the coating film may be a material having a lithium ion conductivity, for example, of $1.0 \times 10^{-9}$ S/cm or more, a material having a lithium ion conductivity of $1.0 \times 10^{-8}$ S/m or more is preferable. On the other hand, in order to suppress the reductive decomposition of the nonaqueous electrolyte as much as possible, the electron conductivity of the coating film is preferably small, and an electron conductivity of $1.0 \times 10^{-2}$ S/cm or less is preferable.

In order to secure the capacity of the negative electrode, the rate of the content of the coating film in the negative electrode is preferably decreased as much as possible. In addition, in order to easily enable lithium ions to come in and go out between the negative electrode active material particles, a uniform coating film is preferably formed as thin as possible. According to those described above, the amount of the coating film contained in the negative electrode is, with respect to 100 parts by mass of the negative electrode active material, preferably 0.01 to 10 parts by mass and more preferably 0.05 to 5 parts by mass.

Next, one example of a method for manufacturing the negative electrode will be described.

(i) First Step

First, a step of preparing a negative electrode precursor including a negative electrode collector and a negative electrode active material layer provided on a surface of the negative electrode collector is performed. In this step, a mixture (mixture agent) containing negative electrode active material particles is mixed with a liquid component, such as water or an organic solvent, to prepare a slurry. Subsequently, the slurry is applied to a surface of the negative electrode collector, followed by drying and rolling, so that a negative electrode active material layer is formed.

(ii) Second Step

Next, a step of covering a surface of the negative electrode active material layer with a coating film having a lithium ion permeability is performed. For example, a coating film containing a lithium compound (first compound) can be formed in such a way that the negative electrode precursor is exposed to an atmosphere containing a raw material of the coating film at 200° C. or less or preferably at 120° C. or less. Accordingly, even when a binder having a low heat resistant temperature is contained in the negative electrode active material layer, without degrading the binder, the coating film can be formed on the surface of the negative electrode active material layer. The coating film is preferably formed by a liquid phase method or a vapor phase method.

As the liquid phase method, for example, a precipitation method or a sol-gel method is preferable. The precipitation method is, for example, a method in which the negative electrode precursor is dipped in a low-temperature solution which is sufficiently lower than 120° C. and which dissolves the raw material of the coating film so as to precipitate a constituent material of the coating film on the surface of the negative electrode active material layer. In addition, the sol-gel method is, for example, a method in which the negative electrode precursor is dipped in a low-temperature solution which is sufficiently lower than 120° C. and which contains the raw material of the coating film so as to deposit intermediate particles of the coating film on the surface of the negative electrode active material layer, followed by gelation.

As the vapor phase method, for example, there may be mentioned a physical vapor deposition method (PVD), a chemical vapor deposition method (CVD), or an atomic layer deposition method (ALD). In general, a PVD and a CVD are each performed at a high temperature of more than 200° C. On the other hand, according to an ALD, the coating film can be formed in an atmosphere at 200° C. or less or 120° C. or less which contains the raw material of the coating film.

By an ALD method, as the raw material of the coating film, an organic compound having a high vapor pressure is used. Since the raw material as described above is vaporized, raw material molecules can be allowed to interact with each other on the surface of the negative electrode active material layer. The raw material molecules are easily allowed to reach voids in the negative electrode active material layer and are also likely to form uniform coating films on the inner walls of the voids.

According to an ALD method, for example, by the following procedure, a coating film covering the negative electrode active material layer can be formed.

First, in a reaction chamber in which the negative electrode precursor is received, a first raw material used as a supply source of the element M and the element A is introduced by vaporization. Accordingly, the negative electrode precursor is exposed to an atmosphere containing the first raw material. Subsequently, when the surface of the negative electrode active material layer is covered with a monomolecular layer of the first raw material, a self-stopping mechanism by an organic group of the first raw material works, so that the first raw material is not further adsorbed on the surface of the negative electrode active material layer. An unnecessary first raw material is purged out from the reaction chamber by an inert gas or the like.

Next, in the reaction chamber in which the negative electrode precursor is received, a second raw material used as a supply source of lithium is introduced by vaporization. Accordingly, the negative electrode precursor is exposed to an atmosphere containing the second raw material. In this case, when the reaction between the first raw material and the second raw material is completed, the second raw material is not further adsorbed on the surface of the negative electrode active material layer. An unnecessary second raw material is purged out of the reaction chamber by an inert gas or the like.

As described above, when a series of operations including the introduction of the first raw material, the introduction of the second raw material, and the purge is repeatedly performed, the lithium compound (first compound) containing the element M, the element A, and lithium is generated, and the coating film having a lithium ion permeability is formed.

Materials used as the first raw material and the second raw material by an ALD method are not particularly limited and, in accordance with a desired coating film, appropriate compounds may be selected. For example, as the first raw material, for example, there may be mentioned a material (such as trimethyl phosphate, triethyl phosphate, tris(dimethylamino)phosphine, or trimethylphosphine) containing phosphorus as the element M, a material (such as tetramethyl orthosilicate or tetraethyl orthosilicate) containing silicon as the element M, a material (such as lithium (bistrimethylsilyl)amide) containing both the element M and lithium, and a material (such as lithium tert-butoxide or lithium cyclopentadienyl) used as a supply source of lithium.

When a material containing the element M is used as the first raw material, as the second raw material, a material used as a supply source of lithium (or a material containing both the element M and lithium) is used. When a material used as a supply source of lithium is used as the first raw material, as the second raw material, a material containing the element M (or a material containing both the element M and lithium) is used. As the first raw material, when a material containing both the element M and lithium is used, as the second raw material, an oxidant (such as oxygen or ozone) may be used.

Furthermore, in order to promote the reaction of each raw material, at an arbitrary timing in the series of operations, an oxidant may be introduced in the reaction chamber so as to be used together with the other raw materials. While the series of operations is repeatedly performed, the introduction of the oxidant may be performed at any timing or may be performed every time.

In addition, at least three types of raw materials may also be used. That is, besides the first raw material and the second raw material, at least one type of raw material may be further used. For example, a series of operations including the introduction of the first raw material, the purge, the introduction of the second raw material, the purge, the introduction of a third raw material different from the first raw material and the second raw material, and the purge may be repeatedly performed.

(iii) Third Step

Next, a nonaqueous electrolyte secondary battery including a negative electrode having a coating film which contains the lithium compound (first compound) and a nonaqueous electrolyte in which a nonaqueous solvent contains the compound having a fluoro group is assembled and is then charged and discharged. By the charge/discharge, at least a part of the compound having a fluoro group is decomposed, and a decomposition product is deposited as a part of the coating film at a surface side thereof. Accordingly, a coating film having a high F concentration region at the surface side is formed. In this case, the coating film having an inner layer and an outer layer is formed.

Hereinafter, by using a square winding type battery as an example, constituent elements other than the negative electrode will be described in detail. However, the type, the shape, and the like of the nonaqueous electrolyte secondary battery are not particularly limited.

FIG. 1 is a perspective view schematically showing a square nonaqueous electrolyte secondary battery according to one embodiment of the present invention. In FIG. 1, in order to show the structure of an important portion of a nonaqueous electrolyte secondary battery 1, the battery is shown after being partially cut away. In a square battery case 11, a flat winding type electrode group 10 and a nonaqueous electrolyte (not shown) are received.

To a positive electrode collector of a positive electrode included in the electrode group 10, one end portion of a positive electrode lead 14 is connected. The other end portion of the positive electrode lead 14 is connected to a sealing plate 12 functioning as a positive electrode terminal. To a negative electrode collector, one end portion of a negative electrode lead 15 is connected, and the other end portion of the negative electrode lead 15 is connected to a negative electrode terminal 13 provided at approximately the center of the sealing plate 12. Between the sealing plate 12 and the negative electrode terminal 13, a gasket 16 is disposed, so that the sealing plate 12 and the negative electrode terminal 13 are insulated from each other. Between the sealing plate 12 and the electrode group 10, a frame body 18 formed of an insulating material is disposed so that the negative electrode lead 15 and the sealing plate 12 are insulated from each other. The sealing plate 12 is bonded to an opening end of the square battery case 11 so that the square battery case 11 is sealed. In the sealing plate 12, a liquid charge port 17a is formed, and the nonaqueous electrolyte is charged in the square battery case 11 through the liquid charge port 17a. Subsequently, the liquid charge port 17a is sealed by a sealing plug 17.

(Positive Electrode)

A sheet-shaped positive electrode includes a sheet-shaped positive electrode collector and a positive electrode active material layer provided on a surface of the positive electrode collector. As the positive electrode collector, for example, metal foil or a metal sheet may be mentioned. As a material of the positive electrode collector, for example, stainless steel, aluminum, an aluminum alloy, or titanium may be used. The positive electrode active material layer can be formed using a positive electrode slurry which contains a positive electrode active material, a binding agent, and a dispersant by a method in accordance with the method for manufacturing a negative electrode active material layer.

The positive electrode active material layer may contain, if needed, arbitrary components, such as an electrically conductive agent.

As the positive electrode active material, a lithium composite oxide is preferable. As a transition metal, for example, there may be mentioned Sc, Y, Mn, Fe, Co, Ni, Cu, or Cr. Among those transition metals, for example, Mn, Co, or Ni is preferable. As a concrete example of the lithium composite oxide, although $LiCoO_2$, $LiNiO_2$, or $LiMn_2O_4$ may be mentioned, the lithium composite oxide is not particularly limited.

(Separator)

As a separator, for example, a resin-made fine porous film, a non-woven cloth, or a woven cloth may be used. As the resin, for example, a polyolefin, such as a polyethylene or a polypropylene, a polyamide, or a poly(amide imide) may be used.

(Nonaqueous Electrolyte)

The nonaqueous electrolyte contains a nonaqueous solvent and a solute dissolved in the nonaqueous solvent. As the solute, various lithium salts may be used. The concentration of the lithium salt in the nonaqueous electrolyte is, for example, 0.5 to 1.5 mol/L.

As the nonaqueous solvent, besides the compound having a fluoro group described above, various compounds may also be used. As the compounds as described above, for example, there may be mentioned a cyclic carbonate, such as propylene carbonate (PC) or ethylene carbonate (EC); a chain carbonate, such as diethyl carbonate (DEC), ethyl methyl carbonate (EMC), or dimethyl carbonate (DMC); a lactone, such as γ-butyrolactone or γ-valerolactone; and a cyclic carboxylic acid ester. Those compounds may be used alone, or at least two types thereof may be used in combination. Among those compounds mentioned above, since a high ion conductivity can be obtained, a cyclic carbonate is preferable, and since the freezing point is low, PC is particularly preferable. In particular, when PC and a fluorinated cyclic carbonate are used in combination, even if the amount of the fluorinated cyclic carbonate is decreased by repeating charge/discharge, a high ion conductivity of the nonaqueous electrolyte can be maintained. The amount of PC in the nonaqueous electrolyte is, for example, preferably 1 to 30 percent by mass and more preferably 2 to 20 percent by mass.

In order to improve the charge/discharge characteristics of the battery, an additive may also be added to the nonaqueous electrolyte. As the additive as described above, for example, vinylene carbonate (VC), vinylene ethylene carbonate, cyclohexylbenzene (CHB), or fluorobenzene may be mentioned. The amount of the additive in the nonaqueous electrolyte is, for example, 0.01 to 15 percent by mass and may also be 0.05 to 10 percent by mass.

As the lithium salt, for example, $LiPF_6$, $LiBF_4$, $LiClO_4$, $LiAsF_6$, or $LiCF_3SO_3$ may be mentioned, and in addition, an imide salt, such as $LiN(SO_2F)_2$(LiFSI) or $LiN(SO_2CF_3)_2$ (LiTFSI), may also be mentioned. The lithium salts may be used alone, or at least two types thereof may be used in combination.

EXAMPLES

Hereinafter, although the present invention will be described in detail with reference to Examples and Comparative Examples, the present invention is not limited to the following Examples.

Example 1

In accordance with the following procedure, a coin type cell using metal lithium as a counter electrode was formed.

(1) Formation of Negative Electrode

Natural graphite particles (average particle diameter (D50): 15 μm) functioning as a negative electrode active material and a binder were mixed together with an appropriate amount of water to prepare a negative electrode slurry. As the binder, a SBR and a CMC were used in combination. With respect to 100 parts by mass of the natural graphite particles, 1 part by mass of the SBR and 1 part by mass of the CMC were blended.

The negative electrode slurry was applied to one surface of copper foil (negative electrode collector) having a thickness of 10 μm, followed by drying and rolling, so that a negative electrode precursor was formed. The total thickness of the negative electrode active material layer and the negative electrode collector was 150 μm. The negative electrode precursor was punched out into a disc having a diameter of 9 mm.

The negative electrode precursor was received in a predetermined reaction chamber, and by the following procedure, a coating film having a lithium ion permeability was formed on a surface of the negative electrode active material layer.

(i) In the reaction chamber in which the negative electrode precursor was received, a first raw material (trimethyl phosphate) functioning as a supply source of an element M (phosphorus: P) and an element A (oxygen: O) were introduced by vaporization. An atmosphere containing the first raw material was controlled so that the temperature was 120° C. and the pressure was 260 Pa. After 30 seconds passed, it was assumed that the surface of the negative electrode active material layer was covered with a monomolecular layer of the first raw material, and an unnecessary first raw material was purged out by a nitrogen gas.

(ii) Next, in the reaction chamber in which the negative electrode precursor was received, a second raw material (lithium(bistrimethylsilyl)amide) functioning as a supply source of lithium was introduced by vaporization. An atmosphere containing the second raw material was controlled so that the temperature was 120° C. and the pressure was 260 Pa. After 30 seconds passed, it was assumed that the monomolecular layer of the first raw material reacted with the second raw material, and an unnecessary second raw material was purged out by a nitrogen gas.

(iii) A series of operations including the introduction of the first raw material, the purge, the introduction of the second raw material, and the purge was repeatedly performed 100 times, so that a coating film of a lithium compound (first compound) was formed.

When the composition of the coating film was analyzed by an XPS, an IPC, and the like, a lithium phosphate having a composition formula of $Li_3PO_4$ was confirmed.

The mass of the coating film per 100 parts by mass of the negative electrode active material was 1.5 percent by mass which was obtained from the mass of the negative electrode precursor before the coating film was formed, the mass of the negative electrode after the coating film was formed, the composition of the negative electrode active material layer, and the specific gravity of each material.

The thickness of the coating film formed by an ALD was estimated in a range of 10 to 25 nm based on the number of series of operations by the ALD.

(2) Formation of Counter Electrode

Metal lithium foil having a thickness of 300 μm was punched out into a disc having a diameter of 14 mm, and this disc was used as the counter electrode.

(3) Preparation of Nonaqueous Electrolyte

In a mixed solvent formed by mixing FEC and FMP at a volume ratio of FEC:FMP=15:85, lithium hexafluorophosphate ($LiPF_6$) was dissolved at a concentration of 1.2 mol/L, so that a nonaqueous electrolyte (electrolyte liquid F) was prepared.

(4) Assembly of Coin Type Cell

A stainless steel-made bottom-closed cell case having an opening was prepared, and inside this cell case, the negative electrode and the separator were placed in this order. For the separator, a non-woven cloth which had a thickness of 0.45 mm and which was formed of a poly(phenylene sulfide) (PPS) was used. In addition, a stainless steel-made sealing plate in which a resin-made gasket containing a polypropylene was disposed at a peripheral portion was prepared, and on an inner surface of the sealing plate, lithium foil functioning as the counter electrode was adhered. After the electrolyte liquid F was charged in the cell case, the opening of the cell case was sealed by the sealing plate, so that a coin type cell (A1) was formed. The cell size was set so that the diameter was 20 mm, and the thickness was 3.2 mm.

[Evaluation 1]

By the use of the coin type cell immediately after the assembly, the negative electrode was charged to 0 V at 45° C. and at a current of 0.1 mA, and sequentially, the negative electrode was discharged to 1.5 V. After a first charge/discharge was performed as described above, an initial reaction resistance R1 was obtained. Next, the charge/discharge was repeatedly performed 30 cycles in a manner similar to that described above, and a reaction resistance Rx was obtained. In addition, a resistance increase rate (AR) was obtained by AR(%)=100×Rx/R1. The reaction resistance was obtained in such a way that an alternating current impedance was measured in a constant-temperature bath at 25° C., and from the Nyquist plot thus obtained, the resistance value of the arc component was read. In addition, the alternating current impedance was measured in such a way that the amplitude was set to 10 mV, and the frequency was changed from 1 to 30 MHz.

[Evaluation 2]

The coin type cell after the initial negative electrode resistance (R1) was measured was disassembled, and the negative electrode was recovered and then washed with EMC. Subsequently, drying was performed at 30° C. for 24 hours, and an analysis was performed in the thickness direction by an XPS. The analytical conditions were as described below.

Radiation Source: Al Kα

Etching Ion: Ar (2 keV)

From the surface of the coating film to the inside of the negative electrode, a peak belonging to the element C was gradually increased and showed the maximum value. On the other hand, a peak belonging to the element F showed the maximum value at a more surface side of the coating film. The thickness of the coating film was estimated to be two times a depth at which the concentration of the element C reached 45 percent by atom. A measurement similar to that described above was performed at 10 points of the coating film, and an average value Tav of the 10 points was obtained. In addition, when the differences ΔT (Tmax-av-Tav and Tav-Tmin-av) of the average value of the 10 points from an average value Tmax-av obtained from two values at the largest side and an average value Tmin-av obtained from two values at the smallest side were obtained, the rate ($\Delta T_R$) of the difference ΔT at the larger side to the average value Tav of the 10 points was 30%.

$\Delta T_R$, an $(F/O)_1$ value in the vicinity (at a depth of 15% of the estimated thickness from the surface) of the surface of the coating film, the ratio of an $(F/O)_2$ value in the vicinity (at a depth of 85% of the estimated thickness from the surface) of the interface between the coating film and the surface of the negative electrode to the $(F/O)_1$ value are shown in Table 1. In addition, the element A (S, N, or Br) other than the element O was less than the detection limit.

Example 2

Except for that a coating film was formed on the negative electrode active material layer by the following method, a battery A2 was formed in a manner similar to that of Example 1 and was evaluated as described above.

(i) In a reaction chamber in which the negative electrode precursor was received, as a supply source of an element M (silicon: Si) and lithium, lithium(bistrimethylsilyl)amide functioning as the first raw material and the second raw material was introduced by vaporization. An atmosphere containing the raw material was controlled so that the temperature was 120° C. and the pressure was 260 Pa. After 30 seconds passed, it was assumed that the surface of the negative electrode active material layer was covered with a monomolecular layer of the first raw material, and an unnecessary raw material was purged out by a nitrogen gas.

(ii) Next, in the reaction chamber in which the negative electrode precursor was received, ozone functioning as an oxidant was introduced by vaporization. An atmosphere containing the oxidant was controlled so that the temperature was 120° C. and the pressure was 260 Pa. After 30 seconds passed, it was assumed that the monomolecular layer of the first raw material reacted with the oxidant, and an unnecessary oxidant was purged out by a nitrogen gas.

(iii) A series of operations including the introduction of the first raw material, the purge, the introduction of the second raw material, and the purge was repeatedly performed 100 times, so that a coating film of a lithium compound (first compound) was formed.

When the composition of the coating film was analyzed by an XPS, an IPC, and the like, a lithium silicate having a composition formula of $Li_4SiO_4$ was confirmed.

The mass of the coating film per 100 parts by mass of the negative electrode active material was 1.5 percent by mass which was obtained from the mass of the negative electrode precursor before the coating film was formed, the mass of the negative electrode after the coating film was formed, and the like.

The thickness of the coating film formed by an ALD was estimated in a range of 10 to 25 nm based on the number of series of operations of the ALD.

Comparative Example 1

Except for that without forming the coating film on the negative electrode precursor by an ALD, the negative electrode precursor itself was used as the negative electrode, a battery B1 was formed in a manner similar to that of Example 1 and was evaluated as described above.

Comparative Example 2

To 100 parts by mass of a mixed liquid containing EC and EMC at a mass ratio of 1:3, 1 part by mass of vinylene carbonate was added, so that a nonaqueous solvent was obtained. $LiPF_6$ was dissolved in the nonaqueous solvent at a concentration of 1.0 mol/L, so that a nonaqueous electrolyte (electrolyte liquid C) was prepared. Except for that the electrolyte liquid C was used, a battery B2 was formed in a manner similar to that of Example 1 and was evaluated as described above.

Comparative Example 3

Except for that the electrolyte liquid C, which was the same as that used in Comparative Example 2, was used, a battery B3 was formed in manner similar to that of Comparative Example 1 and was evaluated as described above.

The results of Examples 1 and 2 and Comparative Examples 1 to 3 are shown in Table 1.

TABLE 1

| BATTERY | RESISTANCE INCREASE RATE $\Delta R$ (%) | Tav (nm) | $\Delta T_R$ (%) | $(F/O)_1$ | $(F/O)_1/(F/O)_2$ |
|---|---|---|---|---|---|
| A1 | 280 | 80 | 30 | 8 | 1.8 |
| A2 | 260 | 70 | 30 | 6 | 2.1 |
| B1 | 420 | 90 | 35 | 1.5 | 0.75 |
| B2 | 390 | 70 | 30 | 0.8 | 1.1 |
| B3 | 345 | 70 | 40 | 0.5 | 1.0 |

Figure 2:
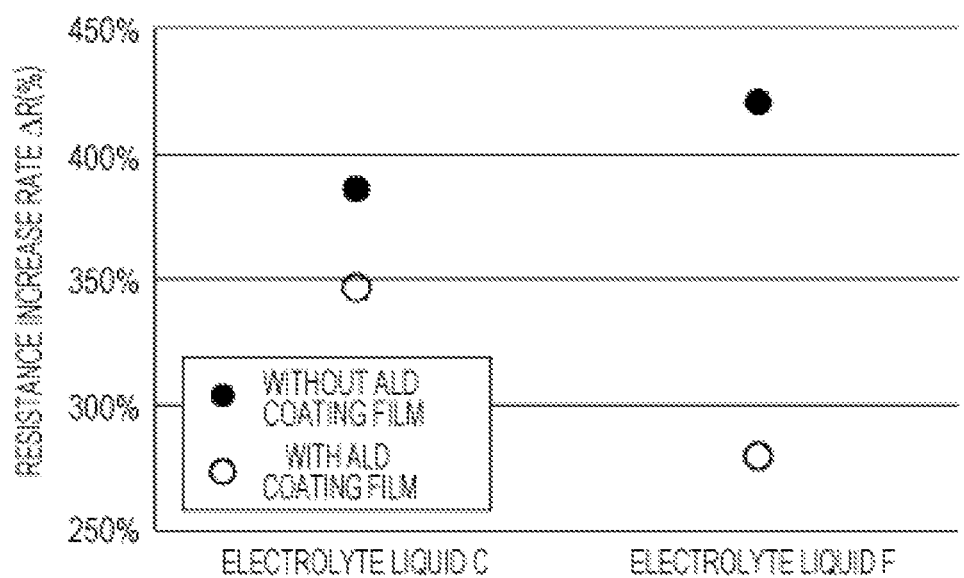
FIG. 2 is a graph showing the comparison of a resistance increase rate between an example and a comparative example.

The results of the resistance increase rate in Table 1 are shown in FIG. 2. As apparent from FIG. 2, when the negative electrode active material layer was covered with the coating film which had a lithium ion permeability and which was formed from a lithium compound containing the element M, the element A, and lithium, and when the compound having a fluoro group was contained in the nonaqueous electrolyte, the reaction resistance was significantly reduced.

INDUSTRIAL APPLICABILITY

The nonaqueous electrolyte secondary battery according to the present invention is useful as a nonaqueous electrolyte secondary battery which is to be used as a drive power source of a personal computer, a mobile phone, a mobile device, a personal digital assistant (PDA), a mobile game device, a video camera, or the like; a main power source or an auxiliary power source for electric motor drive of a hybrid electric car, a fuel cell automobile, a plug-in HEV, or the like; or a drive power source for an electric power tool, a cleaner, a robot, or the like.

REFERENCE SIGNS LIST 1 nonaqueous electrolyte secondary battery
10 winding type electrode group
11 square battery case
12 sealing plate
13 negative electrode terminal
14 positive electrode lead
15 negative electrode lead
16 gasket
17 sealing plug
17a liquid charge port
18 frame body

The invention claimed is:
1. A nonaqueous electrolyte secondary battery comprising:
a positive electrode; a negative electrode; and a nonaqueous electrolyte having a lithium ion conductivity, wherein the negative electrode includes a negative electrode collector, a negative electrode active material layer provided on a surface of the negative electrode collector, and a coating film covering at least a part of a surface of the negative electrode active material layer, the coating film which has a lithium ion permeability, the coating film contains a lithium compound which contains an element M, an element A, an element F representing fluorine, and lithium, the element M is at least one selected from the group consisting of P, Si, B, V, Nb, W, Ti, Zr, Al, Ba, La, and Ta, the element A is at least one selected from the group consisting of S, O, N, and Br, the nonaqueous electrolyte contains a lithium salt and a nonaqueous solvent dissolving the lithium salt, and the nonaqueous solvent contains a compound having a fluoro group, wherein in a vicinity of a surface of the coating film, a molar ratio: $(F/A)_1$ of the element F with respect to the element A contained in the lithium compound satisfies an equation of $0.3 \leq (F/A)_1 \leq 6$, and wherein in a vicinity of an interface between the coating film and the surface of the negative electrode active material layer, a molar ratio: $(F/A)_2$ of the element F with respect to the element A contained in the lithium compound satisfies an equation of $1.2 \leq (F/A)_1/(F/A)_2 \leq 10$.

2. The nonaqueous electrolyte secondary battery according to claim 1, wherein a thickness of the coating film is 0.5 to 200 nm.

3. The nonaqueous electrolyte secondary battery according to claim 1, wherein the lithium salt contains at least one selected from the group consisting of lithium bis(fluorosulfonyl)imide and lithium bis(trifluoromethylsulfonyl)imide.

4. The nonaqueous electrolyte secondary battery according to claim 1, wherein the compound having a fluoro group contains at least one selected from the group consisting of a trifluoropropionate ester and a fluorinated carbonate ester.

5. The nonaqueous electrolyte secondary battery according to claim 4, wherein the trifluoropropionate ester includes methyl 3,3,3-trifluoropropionate.

6. The nonaqueous electrolyte secondary battery according to claim 4, wherein the fluorinated carbonate ester includes fluoroethylene carbonate.

7. The nonaqueous electrolyte secondary battery according to claim 1,
wherein
the coating film partially covers the surface of the negative electrode collector.

8. The nonaqueous electrolyte secondary battery according to claim 7,
wherein the negative electrode active material layer contains carbon material particles as a negative electrode active material, and
the coating film at least partially covers surfaces of the carbon material particles.

9. The nonaqueous electrolyte secondary battery according to claim 8, wherein on interfaces between the lithium compound and the carbon material particles, a compound having a bond between the element M and carbon is formed.

* * * * *